(No Model.)

W. F. BURNS.
AUTOMATIC WEIGHING AND RECORDING SCALE.

No. 502,222. Patented July 25, 1893.

Witnesses,

Inventor
Walter F. Burns
By Dewey & Co.
Atty's

UNITED STATES PATENT OFFICE.

WALTER FRANCIS BURNS, OF SAN FRANCISCO, CALIFORNIA.

AUTOMATIC WEIGHING AND RECORDING SCALE.

SPECIFICATION forming part of Letters Patent No. 502,222, dated July 25, 1893.

Application filed February 28, 1893. Serial No. 464,039. (No model.)

*To all whom it may concern:*

Be it known that I, WALTER FRANCIS BURNS, a citizen of the United States, residing in the city and county of San Francisco, State of California, have invented an Improvement in Automatic Weighing and Recording Scales; and I hereby declare the following to be a full, clear, and exact description of the same, My invention relates to a weighing apparatus, which is also adapted to record weights, and to deliver one card containing the record, and retain the other as a check.

It consists in certain details of construction which will be more fully explained by reference to the accompanying drawings, in which—

Figure 1:
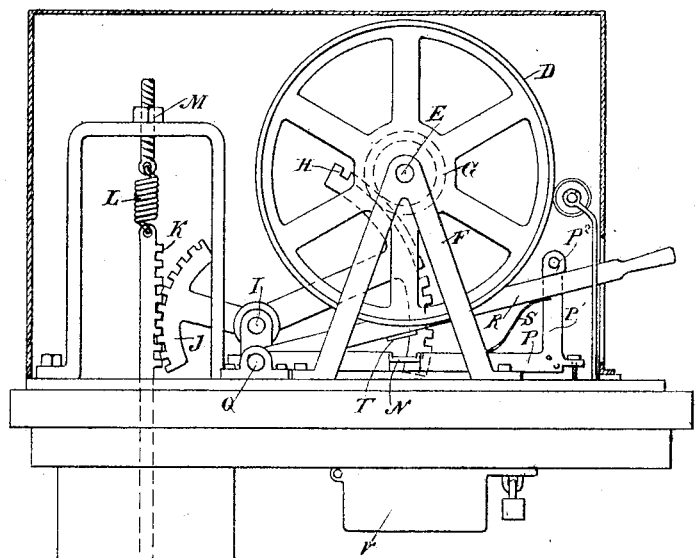
Figure 2:
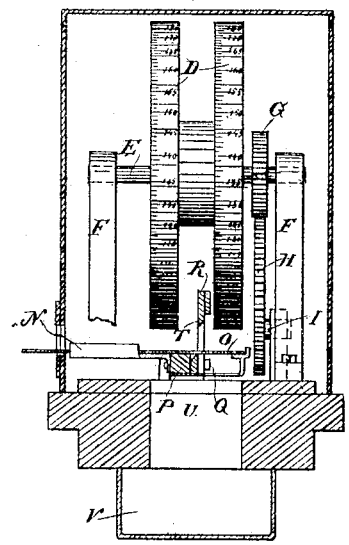
Figure 3:
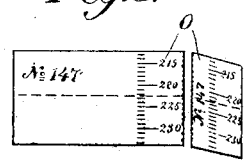

Figure 1 is a rear elevation of a platform scale, with section through the casing showing the attachment of my apparatus. Fig. 2 is a lateral cross section through the casing and connections. Fig. 3 represents a card to be used in connection with my scales.

The object of my invention is to provide a scale for ordinary weighing purposes having an attachment by which the weight actuates a printing-wheel having figures upon its periphery, and in conjunction therewith a receiver into which cards are introduced; a mechanism by which the cards are brought into contact with the printing wheels, whereby the weight is recorded simultaneously upon the two parts of the card; a means for severing one of these parts, and delivering it into a locked receptacle where it is retained until removed by the proper officer.

A is a platform scale, to which I have shown my invention adapted, in the present case having a vertical post B through which the rod C extends in the usual manner to connect the weighing levers in the platform portion of the scale with the indicating mechanism at the upper end. Upon the upper part of the scale is mounted a pair of printing-wheels D having the requisite number of figures marked upon the periphery. These wheels are journaled upon a horizontal shaft E suitably journaled in standards F supported upon the upper part of the scale frame. Upon this shaft is fixed a pinion G, and this is engaged by a segmental rack H pivoted or fulcrumed, as shown at I, and having upon the opposite arm another segment J which engages the vertically moving rack bar K. This rack bar is connected with the rod C so as to partake of the vertical movements of the latter when the weight is placed upon the scale.

In the upper part of the casing, into which the rack bar K projects at the top of the machine, is a spring L connected with the upper part of the rack bar, and having its tension properly adjusted by a screw and nut, as shown at M, so that whenever a weight is placed upon the scale, it will draw the rack bar K downward to a point which is regulated by the tension of the spring L. The rack bar acts to turn the segment J, and through the connecting arms between it, the fulcrum I and the segment H, the latter is caused to turn, and as it engages the pinion G upon the shaft of the printing-wheels D, it will be manifest that the latter will be rotated in proportion to the weight which is placed upon the scale. The figures upon the peripheries of these wheels are so arranged that those figures which indicate the weight upon the scale will be presented downward.

The whole apparatus is inclosed within a suitable case, and through one side of the case is made a slotted guide N adapted to receive tickets which are formed as shown at O, and may be of any suitable or desirable form or description for the purpose. These tickets when slipped into the slot N pass directly beneath the wheels D, as shown plainly in Fig. 2, so that one end of the ticket will stand beneath one of the wheels, and an intermediate portion between it and the other end will stand beneath the other wheel. This card support and platen is mounted upon a lever P fulcrumed at Q, as shown in Fig. 2, and having an upwardly projecting arm P' with a lug or stop P² at the upper end.

R is a lever arm fulcrumed upon the same pin Q, and extending alongside of the upright P', and beneath the lug P². A spring S retains this lever normally in the position shown in Fig. 1, and in this position the slot remains open for the introduction of a ticket as previously described. The lever R is then raised and by reason of its contact with the lug P² it lifts the lever P, and with it a ticket which is brought into contact with the figures upon the lower part of the printing-wheels, and these figures are thus impressed upon a card at two points as before described. The lever R is then pressed downwardly, and it carries a cutting blade at the point T just over the card which has been introduced. This cutting blade may be attached to or formed upon the lower edge of the lever R at this point, and when the lever is pressed down it severs one end of the card which drops through an opening U and falls into a locked receptacle V in line beneath the platen upon which the cards are placed when being printed. The remainder of the card can be withdrawn at will and delivered to the one interested.

In case of luggage which is to be carried by railways, it may be required by the rules of the company that no one can purchase a ticket until he presents a card showing the weight of his luggage. This will be the outer portion of a card printed by the apparatus herein described, and the corresponding inner end of the card will be retained in the secret receptacle, and afterward serve as a check upon all luggage which has been weighed and sent away by the train.

Having thus described my invention, what I claim as new, and desire to secure by Letters Patent, is—

1. A weighing and recording apparatus, consisting of a scale, a vertically moving rod connected with the weighing levers of the scale, a spring with which the upper end of said rod is connected, the tension of which determines the vertical movement of the rod caused by any weight placed upon the scale, inclosed printing-wheels fixed upon the rotating shaft, a pinion fixed to said shaft, a double segmental rack, one arm of which engages the pinion, and the other the vertically moving rack-bar, an intermediate fulcrum to which the uniting arm of said racks is pivoted, a platen or support where cards are introduced beneath the printing-wheels, and a lever mechanism whereby the cards are raised into contact with the back of the printing-wheels, substantially as herein described.

2. A weighing and recording apparatus consisting of a scale, a vertically moving rod extending upwardly from the weighing levers of the scale, a spring fixed above said rod and connecting with its upper end, the tension of said spring determining the amount of movement of the rod caused by any weight placed upon the scale, a pair of wheels fixed to a horizontally rotating shaft and having corresponding rows of type upon their peripheries, a pinion fixed to the shaft of said printing-wheels, a double segmental rack fulcrumed between the pinion and the vertically moving rack, the teeth upon one part of the segment engaging those of the pinion, and upon the other end engaging those of the rack, whereby the movement of the rack-bar caused by a weight upon the scale will rotate the printing-wheels and present corresponding figures upon the lower surface of the wheels, a table or platen upon which a card is introduced beneath the wheels, a lever upon which said platen is supported, a second lever fulcrumed and engaging a lug upon the first named lever whereby the latter is raised and the card brought into contact with the printing-wheels when the lever is raised, a knife carried by the second lever and adapted to sever the card into two parts on a line between the two sets of figures, and a receptacle into which one of said parts falls when severed, substantially as herein described.

3. A weighing and recording mechanism, consisting of a platform scale, printing-wheels mounted side by side upon a horizontally rotating shaft, a mechanism interposed between the printing-wheels and the vertically moving platform of the scale, whereby the movements of the platform are transmitted so as to rotate the printing-wheels, an adjustable spring connected with said intermediate mechanism whereby any weight upon the platform will act upon the spring and also upon the mechanism by which the printing-wheels are rotated so as to present figures representing said weight at the lower part of the wheel, a table or support and a slotted guide through which a card is introduced upon said table in line beneath the printing-wheels, a lever mechanism whereby the card is first raised and duplicate imprints made upon it by the two wheels, a cutter by which when the card is again depressed the inner end containing one of the imprints is severed from the outer end, and a locked containing case into which said inner end is deposited leaving the outer end free to be removed, substantially as herein described.

In witness whereof I have hereunto set my hand.

WALTER FRANCIS BURNS.

Witnesses:
S. H. NOURSE,
GEO. H. STRONG.